J. B. ATKINS.
VEHICLE WHEEL RIM.
APPLICATION FILED JUNE 10, 1916.
1,320,597.
Patented Nov. 4, 1919.
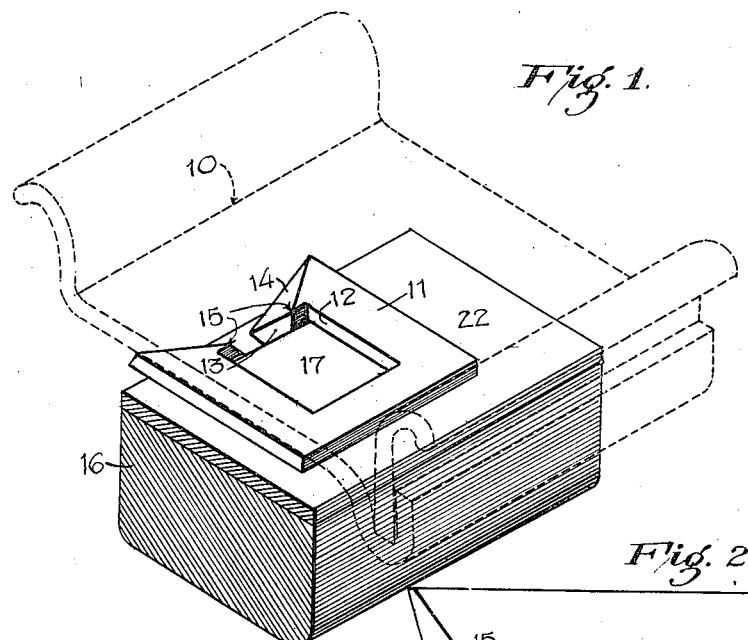
James B. Atkins.

UNITED STATES PATENT OFFICE.

JAMES B. ATKINS, OF AKRON, OHIO, ASSIGNOR TO THE GOODYEAR TIRE AND RUBBER COMPANY, OF AKRON, OHIO, A CORPORATION OF OHIO.

VEHICLE-WHEEL RIM.

1,320,597.  Specification of Letters Patent.  Patented Nov. 4, 1919.

Application filed June 10, 1916. Serial No. 102,927.

*To all whom it may concern:*

Be it known that I, JAMES B. ATKINS, a citizen of the United States, residing at Akron, in the county of Summit and State of Ohio, have invented new and useful Improvements in Vehicle-Wheel Rims, of which the following is a specification.

My present invention relates to vehicle wheel rims and more particularly relates to rims of the demountable type employed for automobile wheels.

A common type of demountable wheel rim is that in which the tire carrying rim is expanded from the felly of the wheel, through the employment of suitable wedges, screws or like instruments. The rim proposed by this invention operates upon a diametrically opposed principle, as the tire carrying rim is arranged to be drawn inwardly against the felly of the wheel.

As a principal object, accordingly, I contemplate the provision of a suitable tire-carrying rim with socket plates depending from the interior circumference thereof, each of the plates being formed with a bolt head receiving recess and a seat at the inner end portion thereof. I provide the wheel felly with a number of radial through bolts, the heads of the bolts projecting outwardly from the felly band in a manner to be received in the socket plates above mentioned, each bolt being equipped with a nut whereby the tire-carrying rim may be tightened down upon the felly band at spaced points upon the circumference of the latter.

It is a further and more specific object of the invention to so form the socket plates of the tire rim that each plate may be easily fitted to its bolt head without the necessitation of any nice adjustment, and it is a correlated object to bevel the sides of the pocket formed in each of the said socket plates and to correspondingly bevel the head of the felly bolt, in order that the latter may at all times be provided with a firmly seated connection to the tire rim.

A still further object of my invention is to equip the felly bolts with suitable spring means to facilitate the operation of mounting the tire rim upon the wheel felly or dismounting it therefrom. This object includes opposed arrangements of the spring means for different embodiments of my invention, each of the arrangements securing to the operation of the device certain advantages to be later set forth.

The above and additional objects of a similar nature, which will be hereinafter more specifically treated, may be accomplished by such means as are illustrated in the accompanying drawings, described in the following specification and then more particularly pointed out in the claims which are appended hereto and form a part of this application.

With reference to the drawings, wherein there has been illustrated a preferred embodiment of the invention as it is reduced to practice and throughout the several views of which similar reference numerals designate the corresponding parts:

Figure 1 is a view in isometrical perspective showing the employment of a felly bolt head within its socket plate, the tire rim being illustrated in dotted lines;

Fig. 2 is an enlarged view in plan of a rim plate with a bolt head accommodated therein;

Fig. 3 is a transverse sectional view taken through the felly and rim of a wheel;

Fig. 4 is a perspective view of one of the felly bolts *per se;* and

Fig. 5 is a transverse sectional view illustrating a modified form of spring action for the felly bolts.

The demountable rim of the present invention has been illustrated as being of the so-called detachable type also, but it will be obvious that the rim mounting means herein disclosed is applicable to any of the many types of rims which it is desired to demountably support upon a vehicle wheel. The rim, designated as a whole by the numeral 10, has welded substantially centrally along the inner face of its base, at points equidistantly spaced, a number of the socket plates 11.

Centrally formed within each plate is the socket recess or pocket 12, which is preferably rectangular in outline and has its sides centrally converging upon equal bevels. Communicating with the pocket 12 through one of its beveled sides is the throat portion 13, the sides of which are also beveled equally with the sides of the recess 12 and are parallel to the two sides of the said recess next adjacent to that recess side through which the throat 13 extends. It will be apparent that the throat forms a passage way which is similar in conformation to the recess but of smaller dimensions.

From the throat 13 there flares outwardly to the nearer corners of the plate 11, a pair of entrant surfaces 14, which are also beveled outwardly from their top edge to the bottom. An inspection of Fig. 2 shows the beveled surfaces 14 intersecting with respective surfaces of the throat 13 and with the entering side of the recess 12 at corresponding points 15. An advantage peculiar to this construction will be later set forth.

One of the radial through bolts for the felly 16 of the wheel is shown in Fig. 4 as being equipped with a square head 17, the sides of which are correspondingly beveled in a pyramidal manner. A squared shank 18 concentrically projected from this head is reduced to the cylindrical form denoted by the numeral 19, which cylindrical portion terminates in the screw threads 20 for the accommodation of the nut 21 whereby the bolt may be tightened in the recess of its rim plate 11.

The felly 16 carries the usual felly band 22 wherein is provided a series of squared apertures 23 designed to receive the squared portion 18 of the bolt shank so that turning or rotation of the bolts is prevented. A cylindrical recess 24 is formed through the felly 16 in axial alinement with each of the squared apertures 23 of the felly band, and a sleeve member 25 is arranged in each of the recesses 24. Each sleeve 25 is bored upon a pair of different radii, one of which is equal to that of the round portion 19 of the bolt shank, while the other boring is relatively larger in order to accommodate a spring 26 in addition to the shank. This spring has been illustrated as of different applications in Figs. 3 and 5. In Fig. 3 the spring 26 is expansible and acts against a washer 27 which abuts the squared portion 18 of the bolt shank while resting upon the shoulders 28 formed at the intersection of the different borings of the sleeve 25. It will be obvious that the effect of the spring 26 in this instance is to force the bolt head outwardly from the felly band. In Fig. 5 the same expansible spring 26 is employed but is arranged to act upon a pin 29 transfixing the lower portion of the bolt, while acting against the felly band at its upper extremity, thus tending to draw the head 17 of the bolt inwardly toward the sleeve 25.

It will be seen that the heads 17 of the bolts can move radially in the socket recesses 12; and that said heads 17 engage the walls at the inner end portions of said socket recesses 12, when the heads 17 are seated in the sockets 11, and prevent lateral displacement of the rim on the felly.

The operation of mounting a rim fitted with the socket plates 11 upon a felly provided with the spring pressed bolts of this invention comprises but two steps. The rim is first approached laterally to the felly with the throat 13 of each socket plate opening toward its bolt head. After the bolts have been received by their respective sockets 12, a tightening of the corresponding nuts 21 is sufficient to maintain the bolt heads securely and properly seated in the inner end portions of the sockets 12 and consequently, to maintain the rim 10 firmly upon the felly 16.

The flaring entrant surfaces 14 permit the assembling of the rim and felly in a manner to obviate the necessity of any nice fitting of the former to the latter in the first step in the operation of assemblage, since the non-rotatable bolt head upon contacting with either of the surfaces 14 upon opposite sides of the throat 13 will be guided into the latter and so properly into the pocket 12. Since the throat 13 is narrower than the recess to which it gives access, it will be apparent that the bolt head will ride relatively high in passing through the throat. Accordingly, should the operation of assemblage be so careless or hasty as not to force each bolt home into its socket, it will be obvious that the points 15 on the throat sides will not be sufficient to balance the bolt head, which will either fall into its recess 12 or slide outwardly altogether. In either case the bolt is not permitted to stick in the throat unknown to the operator, which would result in a most insecure mounting of the rim 10. The square portions 18 of the bolt shanks and the correspondingly shaped apertures of the felly band coöperate to prevent any turning or twisting of the bolt, which would prevent the bolt from entering squarely through the throat, resulting in a jam that would seriously interfere with a handy assemblage of the rim and felly parts. When the nut 21 has once been tightened upon the bolt, accidental removal of the bolt head 17 from its pocket 12 is impossible, since the head must rise up during its passage through the throat 13.

Where the spring 26 is employed in the manner shown in Fig. 3, the bolt head is normally thrust outwardly so that it takes no effort to force it through the throat 13, which is an aid both in the mounting and dismounting of the tire rim. With the spring arrangement shown in Fig. 5 the bolt is drawn inwardly toward the felly band which enables it to snap into place in the pocket after it has ridden over and through the throat 13, the beveled surfaces 14 as well as those of the pocket 12, preventing this contracted action of the bolt from forming a serious impediment to the entrance or displacement of the head 17 from the plate recess.

From the foregoing it will be apparent that my rim mounting means necessitates the employment of but two major elements, namely: an anchor or socket plate to be carried by the rim and an attaching bolt carried by the felly, an engagement taking place between the socket and the bolt whereby interlocking is assured between the socket and the bolt head in order to fasten the rim securely to the felly. It will be apparent that my device may be used when consisting only of these two elements or, otherwise, with the spring 26 arranged in either of the manners disclosed and illustrated.

What I claim is:

1. Means for attaching a tire rim to a wheel felly including recessed plates fixed upon the rim, each of said recesses being provided with a restricted entrance thereto, locking elements yieldably mounted upon the felly, each of said elements having a headed portion thereon for engagement in said recesses, and means upon the recessed plates for guiding the headed portions of the locking elements through said restricted entrances into said recesses, whereby the rim is locked to the felly.

2. Means for attaching a tire rim to a wheel felly including recessed plates fixed upon the rim, each of said recesses having a restricted entrance thereto, locking elements yieldably mounted upon the felly, and provided with headed portions thereon for engagement in said recesses and inwardly converging guide shoulders adjacent the mouth of said restricted entrances for guiding said headed portions into said recesses, whereby the rim is locked to the felly.

3. Means for attaching a tire rim to a wheel felly including, recessed elements fast upon the rim, each of said recesses having a restricted entrance thereto, locking members yieldably connected to the felly, and having headed portions thereon for engagement in said recesses, inwardly converging guides adjacent the mouth of said restricted entrances for guiding the headed portions of said locking elements into said recesses, whereby the wheel and rim are locked together, and means upon said locking elements for firmly engaging the headed elements within said recesses to draw the rim and felly together.

4. Means for securing a tire rim to a wheel felly comprising keeper plates upon the rim portion, each of said plates including a retaining socket having a restricted entrance thereto, radially projected retractile locking elements yieldably mounted upon the felly, and provided with headed portions for engagement within said sockets through said restricted entrances when said locking elements are projected, and means upon said locking elements for retracting the same to prevent the removal of the headed portions through said restricted entrances, whereby said headed portions are held within said sockets to lock the rim and felly together.

5. Means for securing a tire rim to a wheel felly comprising keeper plates upon the rim portion, each of said plates comprising a retaining socket having a restricted entrance thereto, radially projected retractile locking elements yieldably mounted upon the felly and provided with headed portions for engagement within said sockets, when said locking elements are projected, guide surfaces upon the keeper plates for guiding said headed portions into said restricted entrances, and means upon the locking elements for retracting the headed portions within said retaining sockets to prevent withdrawal of the same through said restricted entrances, whereby the wheel and rim are locked together.

6. Means for securing a detachable tire rim upon a wheel felly including locking members radially projected from the felly and anchor plates carried by the tire rim and recessed for the accommodation of respective locking members, each of said anchor plates being provided with a flaring entrance to the recess; and a constricted throat interposed between the recess and its entrance, substantially as described.

7. The combination with a wheel felly and a detachable tire rim therefor, of locking members projecting from the wheel felly; socket plates carried by the tire rim and provided with seats in the inner end portions thereof for interlocking engagement with said locking members, and resilient means connected with each of the locking members for controlling its position in the socket plate.

8. The combination with a wheel felly and a detachable tire rim therefor, of locking members projecting from the wheel felly; socket plates carried by the tire rim and provided with seats in the inner end portions thereof for interlocking engagement with said locking members, and expansible yieldable means normally directing disengagement of each locking member with its seat to facilitate the mounting and dismounting of said detachable rim; and means for positively locking each of the locking members in the seat of its socket plate against the action of said resilient means.

9. The combination with a vehicle wheel and tire rim therefor, of socket plates on the rim provided with pockets which extend radially of the wheel, and spring-pressed bolts arranged on the wheel, the heads of said bolts moving inwardly in said pockets with a snap action to effect interlocking of the sockets and bolts when the rim is pressed on the wheel.

10. The combination with a vehicle wheel and tire rim therefor, of spaced sockets disposed substantially centrally along the inner circumference of the base of the rim, said sockets having pockets which extend radially of the wheel, and non-turnable spring-pressed bolts arranged on the wheel, the heads of said bolts moving into said pockets with a snap action to effect interlocking engagement of the sockets and bolts when the rim is pressed on the wheel.

11. The combination with a vehicle wheel and tire rim therefor, of sockets having pockets which extend radially of the wheel and are provided with throats, and spring-pressed bolts arranged on the felly of the wheel, the head portion of said bolts moving through said throats and thence with a snap action into said pockets to effect interlocking of the sockets and bolts when the rim is pressed on the felly of the wheel.

12. The combination with a vehicle wheel and tire rim therefor, of non-turnable spring-pressed bolts, arranged on the felly of said wheel, and spaced sockets disposed substantially centrally along the inner circumference of the base of the rim, said sockets having inwardly converging pockets which extend substantially radially of the wheel and which have their inner end portions adapted to provide seats for the heads of said bolts.

In testimony whereof I have hereunto signed my name in the presence of two subscribing witnesses.

JAMES B. ATKINS.

Witnesses:
B. J. McDANEL,
L. E. WAGNER.

Copies of this patent may be obtained for five cents each, by addressing the "Commissioner of Patents, Washington, D. C."